United States Patent
Yuan

(10) Patent No.: US 9,471,704 B2
(45) Date of Patent: Oct. 18, 2016

(54) SHARED SCRIPT FILES IN MULTI-TAB BROWSER

(71) Applicant: Song Yuan, Lund (SE)

(72) Inventor: Song Yuan, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 943 days.

(21) Appl. No.: 13/626,537

(22) Filed: Sep. 25, 2012

(65) Prior Publication Data

US 2013/0024759 A1   Jan. 24, 2013

Related U.S. Application Data

(63) Continuation-in-part of application No. 12/574,077, filed on Oct. 6, 2009, now Pat. No. 8,683,319.

(51) Int. Cl.
  G06F 17/00 (2006.01)
  G06F 17/30 (2006.01)

(52) U.S. Cl.
  CPC ............... G06F 17/30902 (2013.01)

(58) Field of Classification Search
  CPC .......... G06F 17/30902; G06F 17/30899; G06F 2209/509
  See application file for complete search history.

(56) References Cited

U.S. PATENT DOCUMENTS

| | | | |
|---|---|---|---|
| 6,192,398 B1* | 2/2001 | Hunt | ............................ 709/213 |
| 6,253,234 B1 | 6/2001 | Hunt et al. | |
| 7,571,197 B2 | 8/2009 | Christensen et al. | |
| 2002/0062354 A1* | 5/2002 | Suraski et al. | ............... 709/212 |
| 2002/0120940 A1 | 8/2002 | Willard | |
| 2002/0184624 A1 | 12/2002 | Spencer | |
| 2003/0197735 A1 | 10/2003 | Woltzen | |
| 2004/0002896 A1* | 1/2004 | Alanen et al. | ................. 705/14 |
| 2004/0010562 A1* | 1/2004 | Itonaga | ........................ 709/213 |
| 2006/0004775 A1 | 1/2006 | Kobayashi et al. | |
| 2006/0047711 A1 | 3/2006 | Cho et al. | |
| 2006/0173843 A1 | 8/2006 | Wilson | |
| 2007/0061700 A1* | 3/2007 | Kothari et al. | ............... 715/505 |
| 2007/0180125 A1 | 8/2007 | Knowles et al. | |
| 2007/0192456 A1* | 8/2007 | Tsukada et al. | .............. 709/223 |
| 2008/0209338 A1 | 8/2008 | Li | |

(Continued)

FOREIGN PATENT DOCUMENTS

WO  0116765 A1  3/2001

OTHER PUBLICATIONS

Hickson, I., Web Workers Editor's Draft Aug. 25, 2009, Google, Inc., 2009 W3C® (MIT, ERCIM, Keio), pp. 1-37, http://dev.w3.org/html5/workers/.

(Continued)

*Primary Examiner* — Scott Baderman
*Assistant Examiner* — Howard Cortes
(74) *Attorney, Agent, or Firm* — Coats & Bennett, PLLC

(57) ABSTRACT

A cloud-based server executes instances of a browser application responsive to requests from a plurality of user devices. The server interprets embedded code in a web document retrieved by a given browsing instance, and stores an intermediate representation of the embedded code in the web document in a dedicated memory resource associated with the given browsing instance. The server also stores the intermediate representation of an external file referenced by the web document in a shared memory resource such that the intermediate representation is accessible to the other browsing instances of the other user devices.

14 Claims, 12 Drawing Sheets

(56) References Cited

U.S. PATENT DOCUMENTS

| | | |
|---|---|---|
| 2009/0063262 A1 | 3/2009 | Mason |
| 2009/0132642 A1* | 5/2009 | Ortal et al. .................. 709/203 |
| 2010/0095213 A1* | 4/2010 | Koster et al. ................ 715/733 |
| 2010/0153929 A1 | 6/2010 | Porras et al. |
| 2010/0223322 A1 | 9/2010 | Mott et al. |
| 2011/0015917 A1* | 1/2011 | Wang et al. .................... 703/23 |
| 2011/0055395 A1 | 3/2011 | Wang et al. |
| 2011/0154219 A1 | 6/2011 | Khalatian |
| 2011/0289108 A1* | 11/2011 | Bhandari et al. ............. 707/769 |
| 2013/0031459 A1* | 1/2013 | Khorashadi et al. ......... 715/234 |

OTHER PUBLICATIONS

Xu, S. et al., "Browser Workload Characterization for an Ajax-Based Commercial Online Service", 2009 IEEE International Symposium on Workload Characterization (IISWC), Oct. 4-6, 2009, pp. 208-216, Piscataway, NJ.

* cited by examiner

```
function foo() {
    /*operations */
} var bar = {
    name1: "value1",
    name2: 100
};
``` www.company.com/lib.js

FIG. 6A

```
<html>
    <script src = "www.company.com/lib.js"/>
    <script type = "text/javascript">
        foo();
        foo = "str";
    </script>
</html>
``` www.company.com/webpage1.html

FIG. 6B

```
<html>
    <script src = "www.company.com/lib.js" />
    <script type = "text/javascript">
        foo();
        bar.name2 = 99;
    </script>
</html>
``` www.company.com/webpage2.html

FIG. 6C

```
/* HTTP Host: static.ak.facebook.com        */
/* Generated: August 7th 2009 4:39:18 AM PDT */
/*    Machine: 10.16.140.107                */
```

*FIG. 8*

```
/* Prototype JavaScript framework, version 1.6.0.2
 * (c) 2005-2008 Sam Stephenson
 *
 * Prototype is freely distributable under the terms of an MIT-style
license.
 * For details, see the Prototype web site: http://www.prototypejs.org/
```

*FIG. 9*

SHARED SCRIPT FILES IN MULTI-TAB BROWSER

CROSS-REFERENCES TO RELATED APPLICATIONS

This application is a Continuation-In-Part application of, and claims priority to, U.S. patent application Ser. No. 12/574,077, filed Oct. 6, 2009 and entitled "SHARED SCRIPT FILES IN MULTI-TAB BROWSER," the entire contents of which are incorporated herein by reference.

BACKGROUND

The present invention relates generally to cloud-based servers that execute web browsers, and more particularly to a server-based mechanism for sharing intermediate representations of commonly used script files between different tabs, windows, frames, panels, or other browser display components for viewing web content.

JavaScript® is a well-known scripting language used to allow computer applications to access software objects within other applications. When first invented, JavaScript® comprised code snippets that were sparsely embedded in a web page, and was used to manipulate the Document Object Model (DOM). JavaScript® has since matured and is now used in a more library-like manner. That is, instead of embedding JavaScript® code among other HyperText Markup Language (HTML) code in a given web page, JavaScript® code is encapsulated in separate files. Each file may be associated with a different functionality or set of features and is included in the web pages. In this manner, a given JavaScript® file can be included in different web pages, and one web page can include more than one JavaScript® file. This helps improve the reusability and modularity of JavaScript®.

By way of example, the common features of a website, such as common user interface logic, may be provided as separate JavaScript® files. These files are included in multiple web pages within a website and provided to a user when the user accesses the website. Thus, when the user interacts with one web page to enter data, for example, the user is presented with a user interface having generally the same look and feel as the other web pages in the website.

The Apple® website illustrates this type of usage very well. Particularly, it puts most of its JavaScript® code into several JavaScript® files in a modular manner. Then, it uses the same JavaScript® files across several different web pages to provide the same or similar functionality across those web pages. At the time of writing, Apple's® home page (www.apple.com), Apple's® Mac® page (www.apple.com/mac), and Apple's® iPhone® page (www.apple.com/iphone) include seven (7) of the same JavaScript® files, while the Mac® and iPhone® pages themselves share three (3) additional JavaScript® files between them.

Typically, web pages import JavaScript® files within the same domain/website. In addition, however, web pages can also import JavaScript® files from one or more different domains/websites. For example, Google Maps, Facebook, and other such services provide JavaScript® Application Programming Interfaces (APIs) so that other developers can develop applications that access the services provided by their JavaScript® files. In such cases, the JavaScript® files would be located at google.com or facebook.com, or some other common repository, and included in the web pages from other websites that intend to use Google Maps or Facebook services.

Additionally, there is another category of standalone JavaScript® files that are used as libraries. Some examples include, but are not limited to, Prototype, JQuery, and Yahoo!® UI (YUI) Library. These libraries "wrap up" common logic into related files and abstract the interfaces used to manipulate web pages. Such libraries make creating and building web pages easier and more maintainable. A large number of well-known websites, some of which are listed by the Pingdom® website (http://royal.pingdom.com/2008/06/11/javascript-framework-usage-among-top-websites), for example, are now using such JavaScript® libraries to facilitate the construction and maintenance of websites.

Currently, most web browsers support the opening of multiple web page instances simultaneously. For example, a web browser that opens a web page containing frames in framesets or iframes, which load other web pages, maintain multiple web page instances. Another example is the "multi-tab browser." As is known in the art, a multi-tab browser allows multiple tabs to be open at the same time in a single browser window. Each tab is a display component of a web browser that allows a user to view web content such as a web page. Additionally, other display components exist that are able to display web content. Such components include, but are not limited to windows, frames, and panels, or other construct that enables a user to view and interact with web content. However, for simplicity sake, each of these different components are referred to herein as "tab" or "display component."

Typically, multi-tab browsers execute on single end user devices, such as a desktop or laptop computer. However, even resource-limited devices, such as mobile devices, provide multi-tab browser functionality. For example, the iPhone® and iPod® provide their users with the Safari browser. Similarly, Android provides the WebKit-based browser. Such browsers, although they may not actually visually display multiple tabs, still provide the multi-tab functionality. In addition, there is now an ongoing trend in that each tab executes as its own separate process to facilitate stability and security, while the core functions of the browser execute as another process. Some examples of modern browsers that use this approach are Google Chrome and Microsoft's Internet Explorer (IE) 8.

Based on the current trends of importing external JavaScript® files and the use of multi-tab browsing as described above, there is a high probability that web pages opened in multiple tabs will include or use the same JavaScript® files. Such a situation is likely to happen, for example, when a user clicks a link in one tab to open a new tab that loads a different web page from the same website. In these cases, some of the JavaScript® files included with the web page in the newly opened tab are likely to be the same as those included with the web page in the current tab. In another scenario, a user may simultaneously open a plurality of tabs, each loading a different website. The web pages in each different tab may all use a common set of services from another entity, such as Google Maps or Facebook, and therefore include the same JavaScript® files from Google Maps or Facebook. In yet another scenario, the web pages in different tabs may all use third-party JavaScript® libraries such as Prototype or JQuery, and therefore, include copies of the same JavaScript® files.

JavaScript® is used in an increasingly library-like manner. This trend continues to strengthen due at least in part to the increased use of HTML5 and the need to optimize different web sites for use with an array of different types of devices having different form factors (e.g., the different screen sizes for a smartphone and an iPad®). Such needs help to fuel the development of a variety of different JavaScript® libraries to perform these functions. Thus, the size of external JavaScript® files tends to increase and the logical structure of the JavaScript® files tend to become more complex.

Still, given these facts, no one has attempted to optimize the resource usage and performance of a browser. Where different tabs include the same JavaScript® files, the browser will repeat the parsing of each file to the JavaScript® syntax tree, and "just-in-time" (JIT) compile the files to bytecode. Additionally, largely same copies of the data structures will also be stored in multiple places in the memory.

As previously stated, web browser applications are typically executed on a single, user device. However, there is a growing trend towards executing browser applications on a server disposed in a cloud network. Particularly, a cloud-based server executes the core browser functionality including interpreting the JavaScript® files, parsing a given web page into the DOM tree, and constructing a render tree from the DOM tree. The user device renders the visual elements contained in the render tree in the order specified by the render tree. The render tree is persistently synchronized between the cloud and the user's device to ensure that the user's device has the most up-to-date rendering information.

Executing a browser application on a cloud-based server does not solve the issues mentioned above with respect to executing the browser application on a single end host device. In fact, migrating the execution of the browser to the cloud network may complicate these issues and make the problems worse. Particularly, a cloud-based server permits connections between the browser application and many different end host devices, each of which will likely access many different web pages and related files. Because the browser applications still may not utilize JavaScript® files as libraries, a browser application executing on a cloud-based server could also repeat the parsing of a JavaScript® file to the JavaScript® syntax tree, and JIT compile the file to bytecode even though that same JavaScript file may have already been parsed and JIT compiled for another tab. Further, like a user device, a browser application executing on a cloud-based server could store many of the same data structures in multiple places in memory. Considering the number of different user devices that may simultaneously connect to the browser application executing on the server, the amount of memory and other resources that the user devices could use when using the browser application is concerning.

SUMMARY

The present invention provides a mechanism that allows multiple instances of a browser window, such as a tab, a window, a frame, or a panel, for example, executing on a cloud-based server to share the intermediate representations of commonly utilized JavaScript® files. According to one or more embodiments, such sharing between browsing instances occurs between multiple browsing instances associated with a single user device, as well as between multiple browsing instances associated with different user devices.

In one embodiment, the cloud-based server comprises a communication interface to communicate data with a plurality of different user devices via a communications network. A memory at the server stores a web browser application. The server also includes a controller that executes one or more browsing instances of the browser application responsive to receiving corresponding requests from one or more of the user devices. Particularly, the controller interprets embedded code in a web document retrieved by a first browsing instance, generates an intermediate representation of the embedded code in the web document, and stores the intermediate representation of the embedded code in a corresponding dedicated memory resource associated with the first browsing instance. The controller then determines whether the intermediate representation of an external file referenced by the web document is stored in a shared memory resource accessible to other browsing instances associated with one or more other user devices. If the intermediate representation of the external file is not stored in the shared memory resource, the controller fetches the external file, generates the intermediate representation of the external file, and stores the intermediate representation of the external file in the shared memory resource.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIGS. 6A-6C illustrate code examples showing how the claimed invention operates in one embodiment.

FIGS. 8-9 illustrate code fragments illustrating other methods by which a device configured according to the present invention determines whether to update the JavaScript® file pool with the intermediate representation of a JavaScript® file.

DETAILED DESCRIPTION

Figure 1:
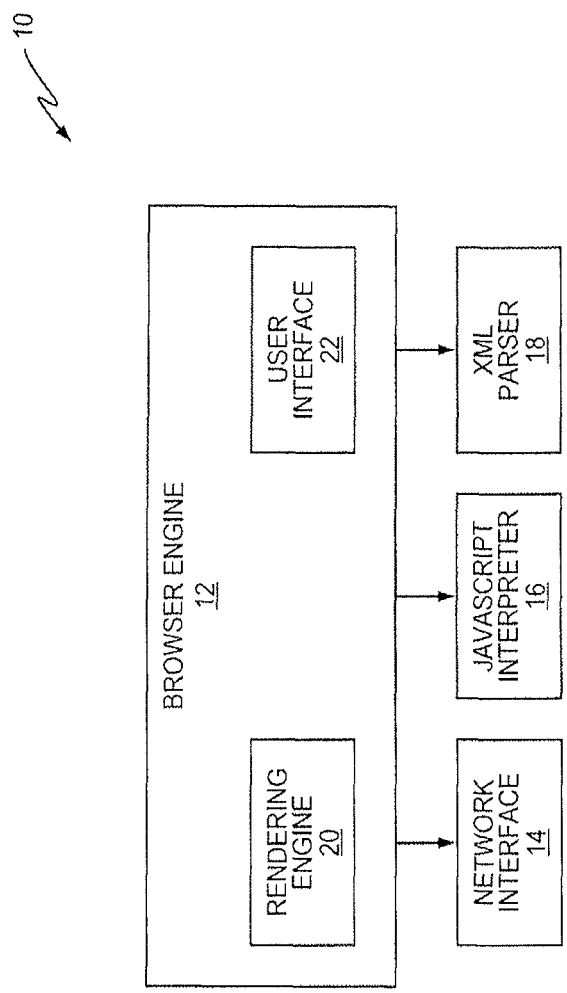
FIG. 1 is a block diagram illustrating a reference architecture for a browser application.

Referring now to the drawings, FIG. 1 illustrates an exemplary architecture for a multi-tab web browser 10 in accordance with one embodiment of the present invention. The web browser 10 is an application program that runs on a host device having processing and memory resources for executing software applications. The host device may comprise, for example, a general-purpose programmable computer, a smart phone, or personal digital assistant.

The main components of the web browser 10 comprise a browser engine 12, a networking subsystem 14, a JavaScript® interpreter 16, and an eXtensible Mark-up Language (XML) parser 18, display back end 24, and data store 26. The browser engine 12 loads Uniform Resource Identifiers (URIs) and supports a variety of different browser actions such as forward, back, and reload. The browser engine 12 also provides various hooks for viewing aspects of a browsing session such as current page load progress. As seen in FIG. 1, the browser engine 12 may comprise or interface with other components such as a rendering engine 20 and a user interface layer 22. The rendering engine 20 produces a visual representation of a web page described in a language such as HTML and XML code. The user interface 22 is the software layer between the user and the browser engine and provides user interface components (e.g., toolbar, progress meters, etc.) and services to the desktop environment or operating system. The networking subsystem 14 implements file transfer protocols, such as HTTP and FTP. The JavaScript® interpreter 16 evaluates and processes JavaScript® code embedded in web pages and JavaScript® code from the external JavaScript® files. The XML parser 18 parses XML documents into a document object model (DOM).

Those skilled in the art will understand that, although not specifically shown in the figures, many browsers 10 will also include other components. One such component is a display back end that provides a set of fonts and user interface widgets which may be used by the user interface. Another component is a data store that stores data associated with browsing activity, such as bookmarks, toolbar settings, cookies, and cached files. Both of these components could, for example, communicate with the browser engine 12 via the user interface 22.

Figure 2:
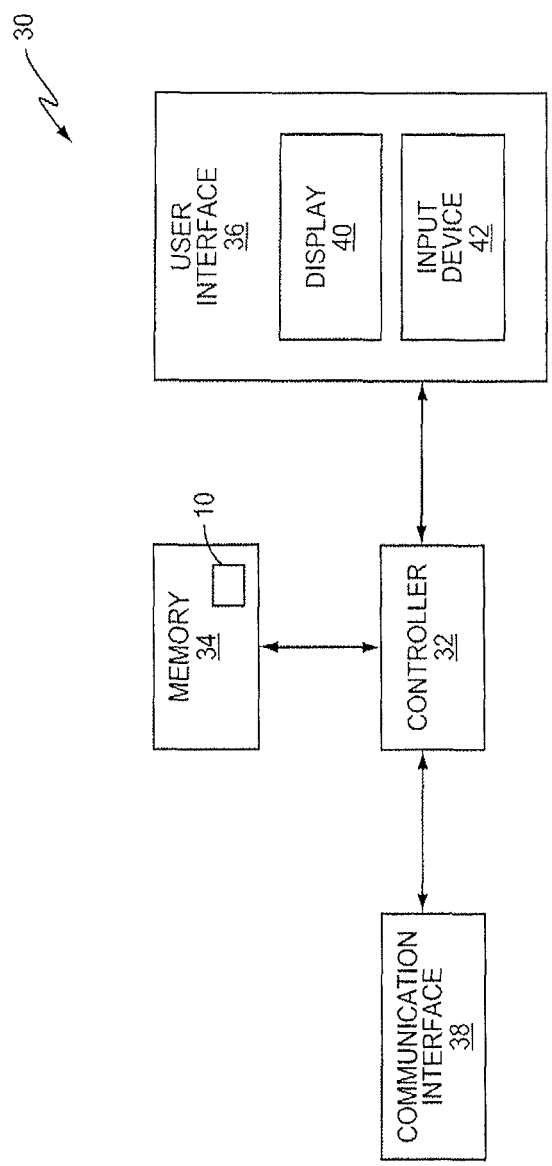
FIG. 2 is a block diagram illustrating some of the main component parts of a host device configured to operate according to the present invention.

FIG. 2 illustrates some of the component parts of a host device 30 suitable for executing the browser application 10 of FIG. 1 according to one embodiment of the present invention. The host device 30 comprises a controller 32, a memory 34, a user interface (UI) 36, and a communication interface 38. The controller 32 may comprise one or more microprocessors, microcontrollers, hardware, or a combination thereof, capable of executing software programs stored in memory 34. Controller 32 communicatively connects to memory 34, user interface 36, and the communication interface 38. As described below in more detail, controller 32 may execute software application programs stored in memory 34 to share the intermediate representations of JavaScript® code and data across multiple tabs in a multi-tab browser.

Memory 34 represents the entire hierarchy of memory in host device 30, and may include both random access memory (RAM) and read-only memory (ROM). Software programs and data required for operating host device 30 may be stored in non-volatile memory, such as EPROM, EEPROM, and/or flash memory, and may be implemented as discrete devices, stacked devices, or integrated with controller 32. The software programs may include an operating system such as WINDOWS XP or NT, UNIX, LINUX, APPLE COMPUTER'S OS X, and the like. The software programs may also include user application programs that perform some function for the user. In one embodiment, for example, memory 34 stores browser 10 that allows a user to connect to and interact with the Internet.

The UI 36 comprises a display 40 and an input device 42. Display 40 may comprise a traditional CRT monitor, a liquid crystal display (LCD), a plasma screen, or the like, or may comprise a display sized for a mobile communication device. Controller 32 may output the results obtained from executing the present invention to the display 40 for viewing by the user. The input device may include, inter alia, a keyboard and/or a pointing device such as a mouse, or a keypad for smaller mobile devices. The user input device 42 permits a user to enter commands, data, and generally control the operation of host system 30.

Host device 30 may further include a communication interface 38 to communicate with one or more remote parties via a communications network. The communications interface 38 comprises a transceiver that allows the host device 30 to communicate with one or more remote parties via a communication network. In one embodiment, the communications interface 38 comprises a fully functional cellular radio transceiver that can operate according to any known standard, including the standards known generally as the Global System for Mobile Communications (GSM), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In other embodiments, the communications interface 38 may comprise a suitable interface includes an Ethernet-based interface adapter cards, such as 10-BASE-T, Fast Ethernet, 10 GbE, or the like, for example, that connects host device 30 to a packet data communications network. In yet other embodiment, the communication interface 38 may comprise a wireless LAN (802.11x) interface, or is a wireless interface card operating according to WiFi standards (e.g., IEEE 802.11) or BLUETOOTH. Those skilled in the art will appreciate that the interfaces listed herein does not comprise an exhaustive list, and that there are many additional interfaces that may be used to connect host device 30 to a communications network.

As previously stated, the present invention provides a mechanism that allows browser 10 to share the "intermediate representation" of external JavaScript® files among multiple tabs, windows, frames, panels, or other display components, in the web browser. The "intermediate representation" includes, but is not limited to, the content of the JavaScript® file, the resultant syntax tree, the variable list (i.e., the symbol table), and in some embodiments, the bytecode. Additionally, the present invention may allow the multiple display components to share data structures and other related data generated from the external JavaScript® files that are used by browser 10 to interpret the JavaScript®. Such a mechanism will help to reduce memory usage and significantly improve the performance of both web page rendering and JavaScript® execution during multi-tab browsing. This is particularly beneficial for resource-limited devices like mobile devices.

Figure 3:
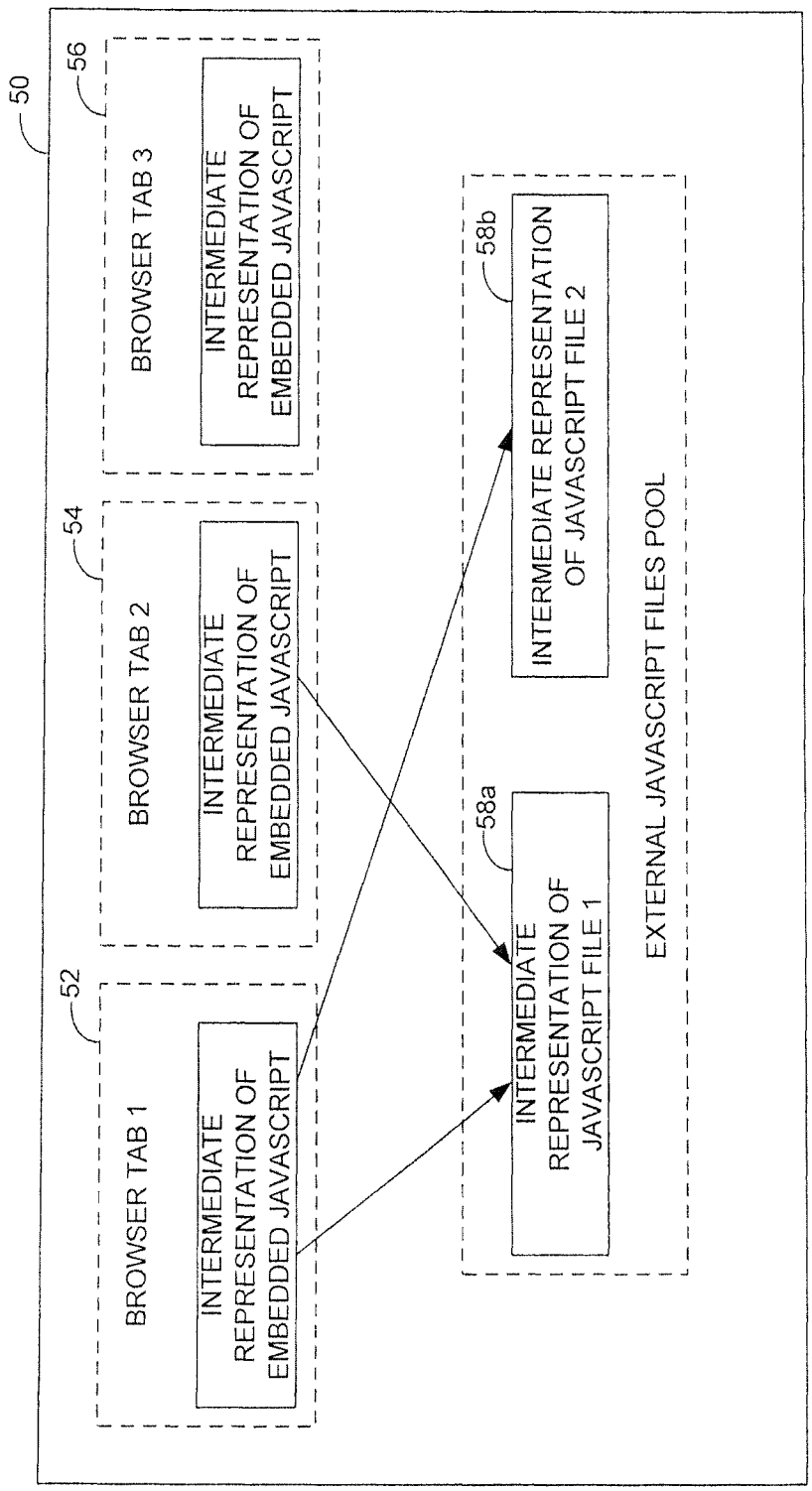
FIG. 3 is a block diagram illustrating how a host device configured according to one embodiment of the present invention uses memory to facilitate access to a common pool of JavaScript® files.

FIG. 3 illustrates how a host device 30 uses the memory 34 for resources that are dedicated to a tab or other display component, as well as shared resources that are shared across two or more tabs or other display components. Particularly, a multi-tab browser window 50 may have multiple tabs 52, 54, 56 open at once. Each tab 52-56 is associated with a web page that may, in turn, be associated with the same or a different domain/website. In FIG. 3, browser tab 52 is associated with a web page that includes two different JavaScript® files—JavaScript® file 1 and JavaScript® file 2. Browser tab 54 is associated with a web page that includes only JavaScript® file 1, and browser tab 56 is associated with a web page that does not include any external JavaScript® files.

The intermediate representations 58a, 58b of the JavaScript® files 1, 2 are pulled from the intermediate representations of the JavaScript® code embedded in tabs 52-56. The intermediate representations 58a, 58b are then saved separately in an external JavaScript® files pool 58. Once stored, the intermediate representation of embedded JavaScript® in the browser tab 52 links to that of JavaScript® files 1 and 2 in external JavaScript® files pool 58, while the intermediate representation of embedded JavaScript® in the browser tab 54 links with that of JavaScript® file 1 in external JavaScript® files pool 58. As a result, host device 30 does not need to repeatedly parse JavaScript® file 1 to a JavaScript® syntax tree. Nor does host device 30 need to "just-in-time compile" the file to bytecode for both browser tabs 52 and 54. Further, only one instance of the intermediate representation of JavaScript® file 1 is saved to memory 34 that all browser tabs can access. This saves memory resources over the conventional method of allocating memory for each browser tab that uses the JavaScript® files. This also reduces execution time over the conventional method of compiling JavaScript® code and "just-in-time compiling" to bytecode repeatedly for each browser tab that uses the JavaScript® files.

Figure 4:
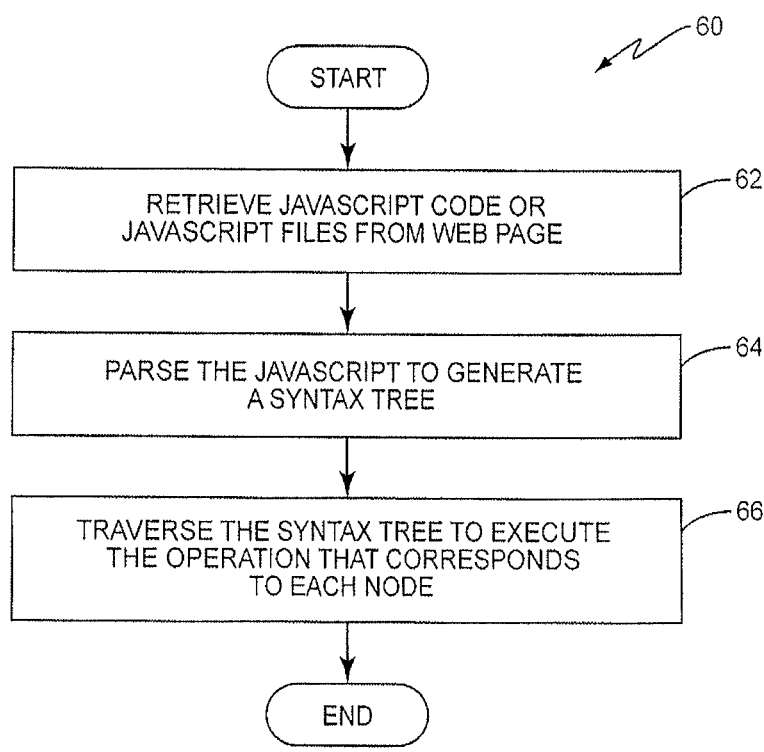
FIG. 4 is a flow diagram illustrating how an interpreter processes JavaScript® files in one embodiment of the present invention.

FIG. 4 illustrates a method 60 by which a host device 30 may process JavaScript® code. Particularly, when browser 10 processes a web document such as a web page, a JavaScript® interpreter sequentially interprets the JavaScript® code. The JavaScript® code may be, for example, code snippets that are embedded in other HTML code, or JavaScript® files that are imported from other repositories specified by a Universal Resource Identifier (URI) in a "src" attribute of a "script" tag. In cases where the JavaScript® code comprises one or more imported JavaScript® files, the contents of the files are first retrieved from the specified URI over HTTP or from a local file system (box 62). There are many known methods of retrieving or importing external JavaScript® files. For example, host device 30 may generate and send an XMLHttpRequest (XHR) to the specified URI to obtain the JavaScript® file. Once received, the host device 30 would extract the JavaScript® code from the response and use an "eval( )" function to load it at runtime.

Since JavaScript® is an interpreted language, the controller 32 will instantly execute the JavaScript® code as the interpreter parses the code. More particularly, the JavaScript® interpreter resident on host device 30 will first parse the JavaScript® code to produce an intermediate representation format like the syntax tree (box 64). A syntax tree is a tree-based, multi-node data structure that represents the grammatical structure of the original JavaScript® language. Each node of the tree denotes a unit of expression or statement. Once the syntax tree is created, the interpreter recursively traverses the tree and performs the operation corresponding to each node while propagating the execution context state along the traverse (box 66). Some operations may result in the definition of new variables. If so, the new variables will be appended to the variable list associated with a specific scope.

As those of ordinary skill in the art know, some JavaScript® interpreters also provide a "just-in-time" compiler that compiles the JavaScript® to bytecode prior to executing the generated bytecode. Bytecode compilation allows for a more efficient and dynamic execution of the code than that of binary code. For example, the SquirrelFish JavaScript® interpreter in the WebKit browser engine compiles a syntax tree to corresponding bytecode. When a new function is defined, the content of the function is saved as corresponding syntax tree under the tree node that denotes the function variable. That corresponding syntax tree is not compiled to bytecode, however, until the first time that the function is invoked. Thereafter, the resultant bytecode may be directly used responsive to invocations of that function.

Figure 5:
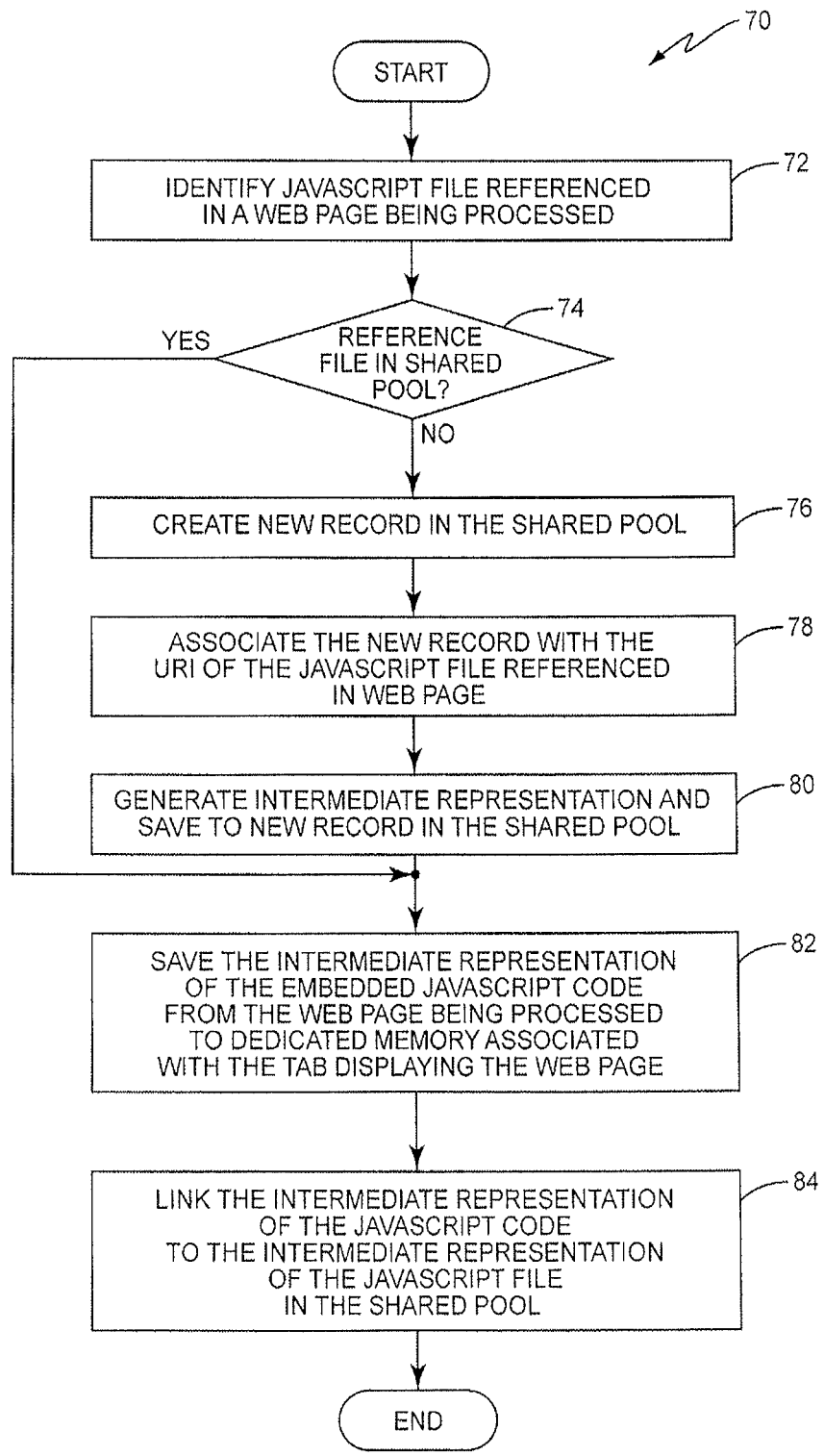
FIG. 5 is a flow diagram illustrating how a device configured according to one embodiment of the present invention processes JavaScript® code.

FIG. 5 illustrates a method 70 in which the host device 30 maintains the intermediate representations for JavaScript® code and saves them to memory according to one embodiment of the present invention. As seen in FIG. 5, the controller 32 identifies the imported JavaScript® file in a web page (box 72). Although there are many methods of identifying the imported JavaScript® file, the browser 10 in one embodiment of the present invention parses the web page contents until it detects a "script" tag with the URI of a JavaScript® file as its "src" attribute. Upon detecting the "script" tag, the controller 32 determines whether the web page references a JavaScript® file already stored in the shared pool 58 (box 74). If the file exists in pool 58, the controller 32 saves the intermediate representation of the embedded JavaScript® code from the web page to a dedicated memory resource associated with the tab processing the web page (box 82). Controller 32 then links the intermediate representation of the embedded JavaScript® code to the intermediate representation of the JavaScript® file in the pool 58 (box 84). If the file does not exist in pool 58, the controller 32 creates a new record in the external JavaScript® libraries pool 58 (box 76). The new record is tagged with the specified URI of the JavaScript® file to associate the record with the file (box 78). The intermediate representation of the JavaScript® file is then generated, and the content of the JavaScript® file that was retrieved by the HTTP client or by the file system, the resultant syntax tree, and the variable list are saved to the new record in pool 58 (box 80). Additionally, in some embodiments, the bytecode generated by the JavaScript® interpreter may also be saved to the newly created record in pool 58. However, it is not required to cache the JavaScript® file content in pool 58. For example, in some cases, the content need not be cached in pool 58 when the server providing the web page supports an HTTP cache mechanism. As above, the containing web page still maintains its own JavaScript® syntax tree, variable list, and bytecode that are generated from the JavaScript® code snippets embedded within the web page. Therefore, the controller 32 saves those artifacts to the dedicated memory resource associated with the tab processing the web page (box 82) and links to the file in the shared memory resource (box 84). The intermediate representation of the embedded JavaScript® in the web page and its counterparts of the included JavaScript® files that reside in the pool 58 form a linked list in the same sequence of their corresponding positions in the web page.

To illustrate method 70, consider Apple's® home page and their iPhone® web page. The Apple® home page (i.e., http://www.apple.com) currently imports approximately fifteen (15) external JavaScript® files. According to the present invention, launching a browser and visiting apple.com will create fifteen (15) corresponding records in the external JavaScript® files pool 58. Additionally, the intermediate representation of the embedded JavaScript® and the data structure that represents the DOM structures of the home page in the tab are saved to the dedicated memory space. The Apple's® iPhone® web page imports fourteen (14) external JavaScript® files, seven (7) of which are identical to those associated with Apple's® home page. If the user opens the iPhone® web page in a new tab, the interpreter goes through each "script" tag to determine whether the imported external JavaScript® file associated with the "script" tag is already cached in the pool 58. In this case, the interpreter would find seven (7) records in pool 38 that could be re-used and linked to by the newly opened tab.

As previously stated, the current trend is to allow each tab to execute as its own separate process. Therefore, the memory 34 where the intermediate representations of the external JavaScript® files in pool 58 are stored is shared among the multiple processes. As those skilled in the art will readily appreciate, there are many methods in which to share memory across processes. However, one embodiment of the present invention utilizes an Inter-Process Communication (IPC) mechanism to facilitate such sharing. For example, a Portable Operating System Interface for Unix (POSIX) compliant mmap( )system call and the Unix System V IPC Shared Memory facilities are both suitable for implementing shared JavaScript®.

With some operating systems such as Linux, the shared library comprises a read-only part and a read/write part. The read-only part includes the symbol table, the text (binary of the instructions) and read-only data. The read/write part includes other data such as regular data, for example. When multiple programs that link with the same shared library execute simultaneously, there is only one copy of the read-only part of the shared library in the memory. However, there is one copy of the read/write part per instance of the program. Therefore, the program maintains the modifications of the read/write data for itself, while the read-only part is shared among the other instances of the executing programs. However, the language feature of JavaScript® dictates that there be no division between read-only and read/write parts for a JavaScript® shared library. Thus, any symbol can be rewritten at runtime. Even a function in JavaScript® is one of the variable types, and is not particularly different from other variable types, such as the object type or string type. Moreover, the variable type is not strictly bound with the variable, and thus, the variable can always be re-assigned with a value of another variable type at runtime.

FIGS. 6A-6C better illustrate an example of this aspect. Particularly, FIG. 6A illustrates an example of code for function foo( )included in the JavaScript® library file "www.company.com/lib.js." FIGS. 6B (www.company.com/webpage1.html) and 6C (www.company.com/webpage2.html) illustrate examples of HTML code snippets that are executed whenever a user launches a browser and visits a pair of related web pages. The code in both FIGS. 6B and 6C call function foo( ) and thus, both web pages import "lib.js" of FIG. 6A.

When webpage1.html is opened, the generated intermediate representation associated with the "lib.js" of FIG. 6A is saved to the external JavaScript® libraries pool 58. In this embodiment, the intermediate representation saved to the pool 58 includes the syntax tree that describes the grammatical structure of lib.js, the variable list containing the function foo( ) and the object "bar." If the JavaScript® interpreter uses lazy just-in-time bytecode compilation, the interpreter will delay generating the bytecode for function foo( )until foo( )is invoked in webpage1.html. Thereafter, the generated bytecode for foo( )is saved among the other data associated with lib.js in the pool 58. Once invoked, foo( )is re-assigned with a string in webpage1.html. However, this modification is not written back to the pool 58. Instead, foo( )is appended to a "dirty" variable list of lib.js with a new string value. The dirty variable list of lib.js is then saved with the other intermediate representation of webpage1.html instead of in the external JavaScript® files pool 58. This "dirty" variable list of lib.js includes all variables of lib.js that have been modified locally in webpage1.html.

When webpage2.html is opened (e.g., in a new tab or a new instance of a browser window), the interpreter determines that the html code imports the external script file "lib.js" from an inspection of the URI "www.company.com/lib.js." However, instead of interpreting the JavaScript® file lib.js, the interpreter first searches the external JavaScript® libraries pool 58 to determine whether a record for the lib.js JavaScript® file already exists. Upon determining that a record for lib.js already exists in the pool 58, the saved JavaScript® syntax tree, the variable list, and the bytecode associated with lib.js are directly linked to webpage2.html. Thereafter, when foo( )is invoked as a function by webpage2.html, the interpreter searches the saved linked variable list of lib.js for the definition of function foo( ) The bytecode of function foo( )that was generated during its invocation in webpage1.html is then directly used for execution in webpage2.html.

Any modifications of foo( )by webpage1.html, such as the "dirty" variable list, are not visible to webpage2.html. Nor are modifications of foo( )by webpage2.html visible to webpage1.html. Therefore, if webpage2.html were to modify the property "name2" of object "bar" to 99, the modified "bar" object is appended to the "dirty" variable list of lib.js in webpage2.html. Although this modification overwrites the original value for "name2" in the original "bar" object in lib.js, the modification is seen only by the code in webpage2.html. Provided webpage1.html did not modify the value for "name2" in its copy of "bar," the code in webpage1.html will still reference the original "name2" of 100 value in lib.js.

As previously stated, the present invention first searches the pool 58 to determine whether a given JavaScript® file or code referenced in a web page should be imported. Such a search is likely to occur, for example, in three different scenarios. The first scenario occurs whenever a user clicks a link in one tab to open a new tab that loads a different web page from the same website. The second scenario occurs whenever the user simultaneously opens a plurality of tabs, each loading a different website. The third scenario occurs when different web pages in different tabs all include copies of the same third-party JavaScript® files.

For the first and second scenarios, the controller 32 could inspect the URI identifying the JavaScript® files in the web page HTML code. However, HTML code in which a "script" tag has the same URI as its "src" attribute does not necessarily mean that it references the same JavaScript® file. Even if they are the same, the content of the JavaScript® file could have changed over time. For example, the browser typically generates and sends an HTTP GET message to retrieve a given JavaScript® file from a network server. The HTTP GET request message typically includes the URI to identify the JavaScript® file. However, the URI that is extracted from the HTML code may reference a JavaScript® file that has been modified by the server on which it resides. Thus, the JavaScript® file identified in the HTTP GET request message may be a different version of the file already represented in the pool 58. Additionally, the HTTP server providing the HTTP response may generate the JavaScript® file content that is returned in the body of the HTTP response on the fly. In such cases, the JavaScript® file represented in the pool 58 may not be exactly the same as the actual JavaScript® files referenced in the HTML code or provided by the server.

Figure 7:
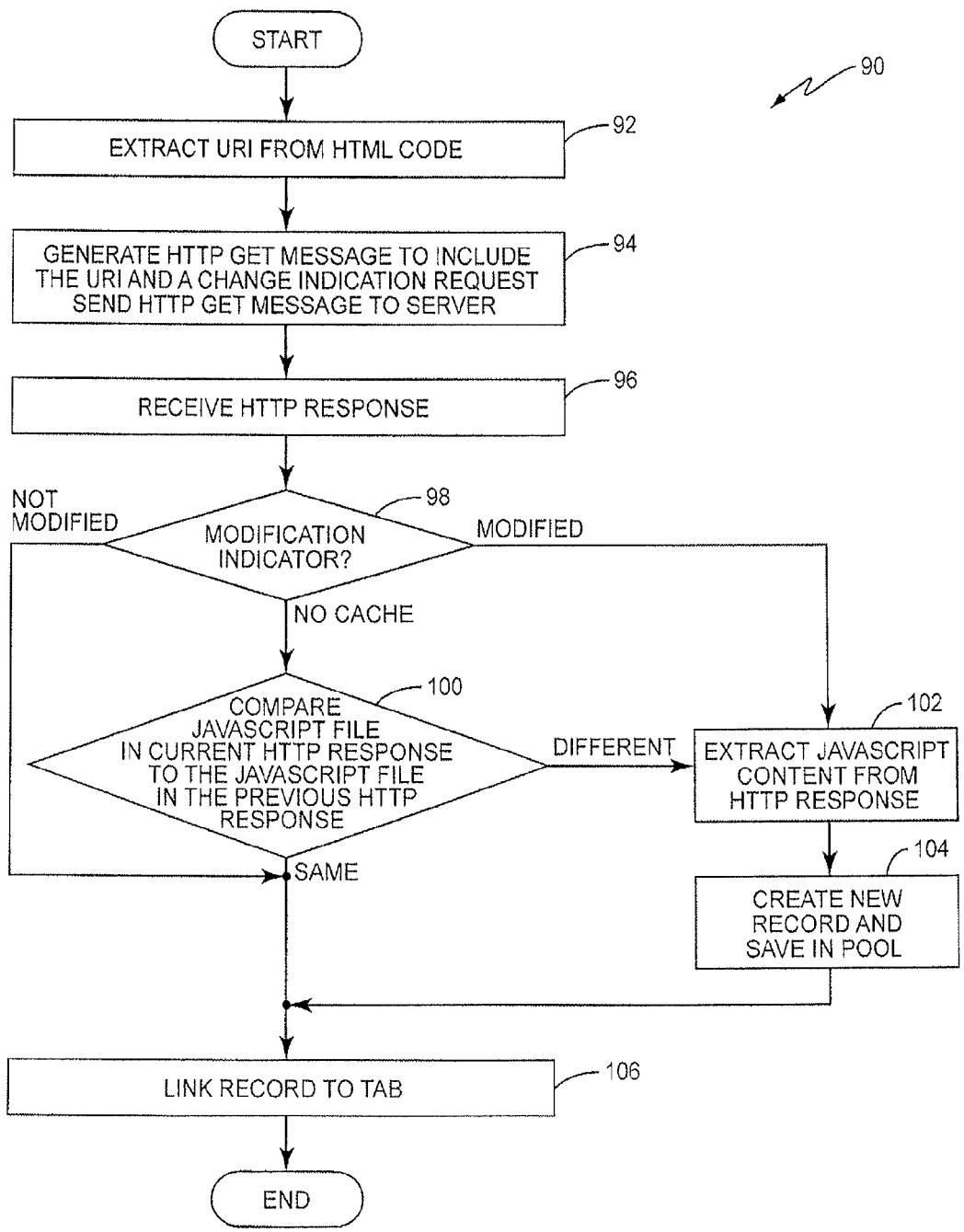
FIG. 7 is a flow diagram illustrating an exemplary method by which a device configured according to the present invention determines whether to update the JavaScript® file pool with the intermediate representation of a JavaScript® file.

Therefore, one embodiment of the present invention illustrated in FIG. 7 advantageously utilizes the HTTP cache mechanism in these situations to determine whether a JavaScript® file referenced in an HTML web page already exists in the pool 58. Method 90 of FIG. 7 begins with the controller 32 executing code that extracts the URI from the HTML code of a web page (box 92). Once extracted, the controller 32 generates an HTTP GET request message to obtain the JavaScript® file identified by the extracted URI, and sends the message to the server (box 94). The generated HTTP GET request message includes the extracted URI and a modification request indicator that signals the server to determine whether the target JavaScript® file has been modified. By way of example, the controller 32 may include an HTTP entity tag as a modification request indicator in the HTTP GET request message to the server. Upon receipt, the server would determine whether the target file was modified, and return an HTTP entity tag as one of the HTTP validators in a response. Upon receiving the response (box 96), the controller would inspect the returned entity tag (box 98).

If the server returns, for example, a "304 Not Modified" response message with no file content in the body, the browser can safely determine that the URI references the exact same copy of the JavaScript® file as that of an existing tab. That is, a copy of the intermediate representations for the JavaScript® file identified by the URI in the "script" tag already exists in the pool. In that case, the controller 32 would simply link the tab having the webpage to that data in pool 58 (box 106). If the server returns a "Modified" indicator in the response message, however, the controller 32 would then extract the JavaScript® code from the body of the response message (box 102) and create a new record for the intermediate representation data, as previously described (box 104), before linking the tab with the newly created record (box 106).

If the HTTP response message indicates that the previous cache has expired, or that the HTTP response does not support cache mechanism, (e.g., the HTTP response message is sent with a "NO-CACHE" indicator in the cache-control header), then the controller 32 extracts the JavaScript® file from the new HTTP response and compares it to a cached JavaScript® file from the previous response (box 100). The comparison is a literal comparison and will determine whether the JavaScript® file identified by the URI is identical to a previously received file. If the comparison indicates that the files are the same, the controller 32 will simply link the tab to the associated record stored in memory (box 106). Otherwise, controller 32 determines that it is a different JavaScript® file, extracts the file from the HTTP response (box 102), and creates and saves a new record to store the intermediate representation to the external JavaScript® file pool 58.

The "literal" comparison of box 100 may be performed by any method known in the art. In some embodiments, for example, a hash value or checksum is used to assist processing the lexical comparison. In another embodiment, a lexical comparison of the file content is performed; however, analyzing the URI of the JavaScript® file and performing the lexical comparison of the file content may be somewhat more complex. For example, to load the Google Maps JavaScript® API, the code calling the API would set the "src" attribute of "script" tag to:

"http://maps.google.com/maps?file=api&v=2&key=[KEY_STRING]".

This URI includes the HTTP GET parameters represented here by the italic text, which may vary across different web pages. For example, the [KEY_STRING] parameter is generated for corresponding domain names by signing into the Google Maps service. Another web page calling the same URI, however, might have a different domain name. Therefore, the URI would have a different [KEY_STRING] parameter, and thus, the URI would be different. As such, while comparing URI's, the HTTP GET parameters should be ignored.

In another example, HTML code may load the Facebook JavaScript® API by calling the following:

http://static.ak.facebook.com/js/api_lib/v0.4/FeatureLoader.js.php.

In this case, the JavaScript® file is actually automatically generated by the HTTP server on-the-fly, an example of which is seen in FIG. 8. As seen in FIG. 8, the header of the file includes information such as a host name, the server IP address where the file is generated, and the exact time when the file is generated. As seen in FIG. 8, such information is normally placed in the file as comments. Therefore, when performing the comparison, the present invention avoids comparing the comment sections. Because the server alters the comment sections, there are no alterations to the JavaScript® file logic.

Regarding the third scenario—i.e., when different web pages in different tabs all include copies of the same third-party JavaScript® files—the URI cannot be used to determine whether the JavaScript® files already exist in the pool 58. Because third party JavaScript® libraries like Prototype or JQuery are considerably large, the user needs to download those libraries to their web server, and then include them as local JavaScript® files instead of importing them from remote sites. For example, the apple.com web pages use Prototype v.1.6.0.2 and include it as a local file at:

images.apple.com/global/scripts/lib/prototype.js.

Contrast this location with the web pages at The New York Times website www.nytimes.com. The N.Y. Times website also uses Prototype 1.6.0.2, but includes it as its own local file at:

graphics8.nytimes.com/js/app/lib/prototype/1.6.0.2/prototype.js.

Even though these two files are referenced from different URIs, they are exactly the same file. In such cases, the controller 32 may utilize the header section of the file to determine whether it already exists in the JavaScript® pool 58. As seen in FIG. 9, for example, file name and version information contained in the file header may be compared to a list of known third-party JavaScript® libraries, and thus, used to assist in the lexical comparison of the JavaScript® files.

In another embodiment, the present invention is applied to the just-in-time-compiling feature for multiple Java applications in a Multiple Address Space (MAS) operating system, such as Linux or UNIX. This embodiment is conceptually similar to JavaScript® running in multi-tab browser. Particularly, Java applications typically share classes (e.g., java.lang.string). These classes will generally be "just-in-time-compiled" from bytecode to native binary code prior to execution. If the common classes are compiled within each application, as is conventional, the costs are high in terms of memory and execution time. However, those costs can be lowered by compiling the common classes once and using them for all applications.

In these cases, the fork( )system call in UNIX is used. If the virtual machine execution starts with a "main" Java application, which then launches other Java applications, the overhead for the common classes will be shared by all applications. This is, of course, assuming that these common classes are compiled by the main application. Generally, the behavior of the fork( )system call is particularly important in the context of just-in-time compilation. That is, it allows binary compiled code to be shared in a straight-forward way at runtime. However, this Java/UNIX case is different from the present invention because it relies on the fork( )system call to "clone" the application. Particularly, the fork( )system call creates a clone of the parent process including its data. This results in several copies of the same data. In contrast, the present invention permits sharing JavaScript® code being executed in independent browser tabs. The JavaScript® would share some common components, but would never be a clone of another process.

A related topic is the shared web worker defined in HTML5. Web worker is a new set of APIs that run JavaScript® in parallel in the background. A "worker" can be defined in a separate JavaScript® file and created using a related API (e.g. "var worker =new Worker('worker.js');"). This is different from importing an external JavaScript® file in that the JavaScript® variables defined in "worker.js" are not visible externally. The only way to communicate with the worker is via message-passing. A shared worker, as one category of web worker, is able to coordinate with multiple "pages" (as used in W3C Web Worker Working Draft, and is equivalent with "tab" in this context) via message-passing. A shared worker can also help set up direct message channel between two tabs.

Shared workers are different from the present invention, because the present invention proposes a way to share intermediate representation of external JavaScript® files imported in multiple tabs. A shared worker, in contrast, is a new API to facilitate the coordination of message-passing between tabs. Further, the present invention aims to improve the performance of the current browser's JavaScript® interpretation implementation, and it requires no changes in the existing W3C web standards.

As mentioned above, this invention helps the multi-tab browser avoid repeatedly interpreting the duplicated JavaScript® files, and generating the syntax tree and bytecode. Therefore it will significantly save memory resources, eliminate the wasteful runtime overhead associated with interpreting the same file multiple times, and reduce execution time as a result. Such improvements are particularly beneficial to resources-limited devices like mobile devices.

Table 1 illustrates how much execution time can be potentially reduced using the present invention. The values in Table 1 are collected from a WebKit-r38097 Gtk port in Linux executing on an HP Compaq DC7900 (Core2 Quad-core 2.83 GHz). The JavaScript® engine in WebKit-r38097 is SquirrelFish Extreme (SFX). The clock( ) function from GNU C library was used at the beginning and the end of various steps of JavaScript® interpretation, and the values were subtracted to get the number of CPU clock ticks elapsed in each step. The number of clock ticks per second measured by clock( )function is 1,000,000 in this case. The minimum resolution of clock( )function is 10,000. Therefore, where the number of clock ticks was lower than 10,000, that value is displayed as 0.

The WebKit instance was used to browse Apple's® home page (http://www.apple.com). The instance measured the number of CPU clock ticks used in generating syntax tree and bytecode, respectively. The SFX is also able to just-in-time compile bytecode to native code in a x86 platform, but this step is not measured because it is not applicable to embedded platforms like ARM yet. The result are shown as follows in Table 1. Not all the JavaScript® files used by Apple's® home page are listed. Further, "www.apple.com" indicates the JavaScript® code embedded in Apple's® home page.

TABLE 1

| JavaScript ® source url | Ticks for generating syntax tree | Ticks for generating bytecode | File size in kilo bytes |
| --- | --- | --- | --- |
| images.apple.com/global/scripts/view_master_tracker.js | 10000 | 0 | 7.05 |
| images.apple.com/global/scripts/swap_view.js | 30000 | 10000 | 31.7 |
| images.apple.com/global/scripts/lib/event_mixins.js | 10000 | 0 | 7.93 |
| images.apple.com/global/metrics/js/s_code_h.js | 50000 | 20000 | 43.5 |
| images.apple.com/global/nav/scripts/shortcuts.js | 30000 | 10000 | 19.6 |
| images.apple.com/home/scripts/promomanager.js | 10000 | 0 | 2.74 |
| C2C738.r.axf8.net/mr/a.gif?a=C2C738&v=1 | 0 | 0 | 69 bytes |
| images.apple.com/global/scripts/apple_core.js | 60000 | 10000 | 16.8 |
| images.apple.com/global/scripts/lib/scriptaculous.js | 170000 | 20000 | 115 |
| images.apple.com/global/scripts/lib/prototype.js | 180000 | 30000 | 123 |
| www.apple.com | 10000 | 10000 | N/A |

Of the JavaScript® files listed in Table 1, "s_code_h.js," "shortcuts.js," "apple_core.js," "scriptaculous.js," and "prototype.js" are also used by other apple.com web pages including the Mac® web page. As a result, at least 580,000 CPU clock ticks of execution time can be saved while browsing the Mac® web page in a second tab. This corresponds to approximately 0.58 seconds of CPU time. Those skilled in the art will appreciate, however, that this value is collected using a Core2 Quad-core 2.83 GHz desktop PC. This value might be substantially larger for a mobile device.

Similarly, the potential memory size that can be saved is measured by the amount of memory required to store the data structure of the syntax tree, the bytecode, and other artifacts related to the JavaScript® files that are shared among tabs. Measuring memory size per application or per data structure is never an easy task. Factors such as shared memory, committed memory, and others, in Linux, for example, tend to complicate such calculations. However, in this example, the prototype.js file was retrieved from apple.com and a mock-up web page was created to include that JavaScript® file. Thereafter, the values of free memory size from "/proc/meminfo" were read while loading the mock-up web page both with, and without, importing the JavaScript® file prototype.js. Both values were then subtracted to get an approximate value of how much memory is allocated for prototype.js and its related data structure. The experiment was conducted several times to get the average figure to minimize error. The final figure is approximately 3.75M. Therefore, if the second tab having the apple.com Mac® web page can re-use the intermediate representation of prototype.js loaded with the first tab having the apple.com home page, about 3.75M of memory space can be potentially saved.

The previous embodiments describe the present disclosure in terms of host device 30 being a single user device executing a browser application. However, as stated above, the present invention is not limited simply to use on a single user device. Rather, the present invention may be utilized on a cloud-based server that provides the browser application 10 as a service to one or more user devices.

Particularly, multiple users may connect to the cloud-based server, which executes the browser application 10 for the users. In accordance with the present invention, the server is configured to allow each of the connected multiple users to share the intermediate representations of commonly utilized JavaScript® files between multiple tabs or "browsing instances" in the Cloud. Such sharing may occur among the multiple tabs associated with a single user device and/or among the multiple tabs of a plurality of different users connected to the cloud-based server. As previously described, the intermediate representations may include, but are not limited to, file content, syntax trees, variable lists or symbol tables, bytecode, and other related data and data structures generated by the JavaScript files and used to interpret the JavaScript at the cloud-based server. Such a mechanism not only improves the browsing performance for the users, but also reduces the resource load placed on the cloud-based server executing the browser application as well as on the network. FIGS. 10-13 illustrate this aspect of the present disclosure in more detail.

Figure 10:
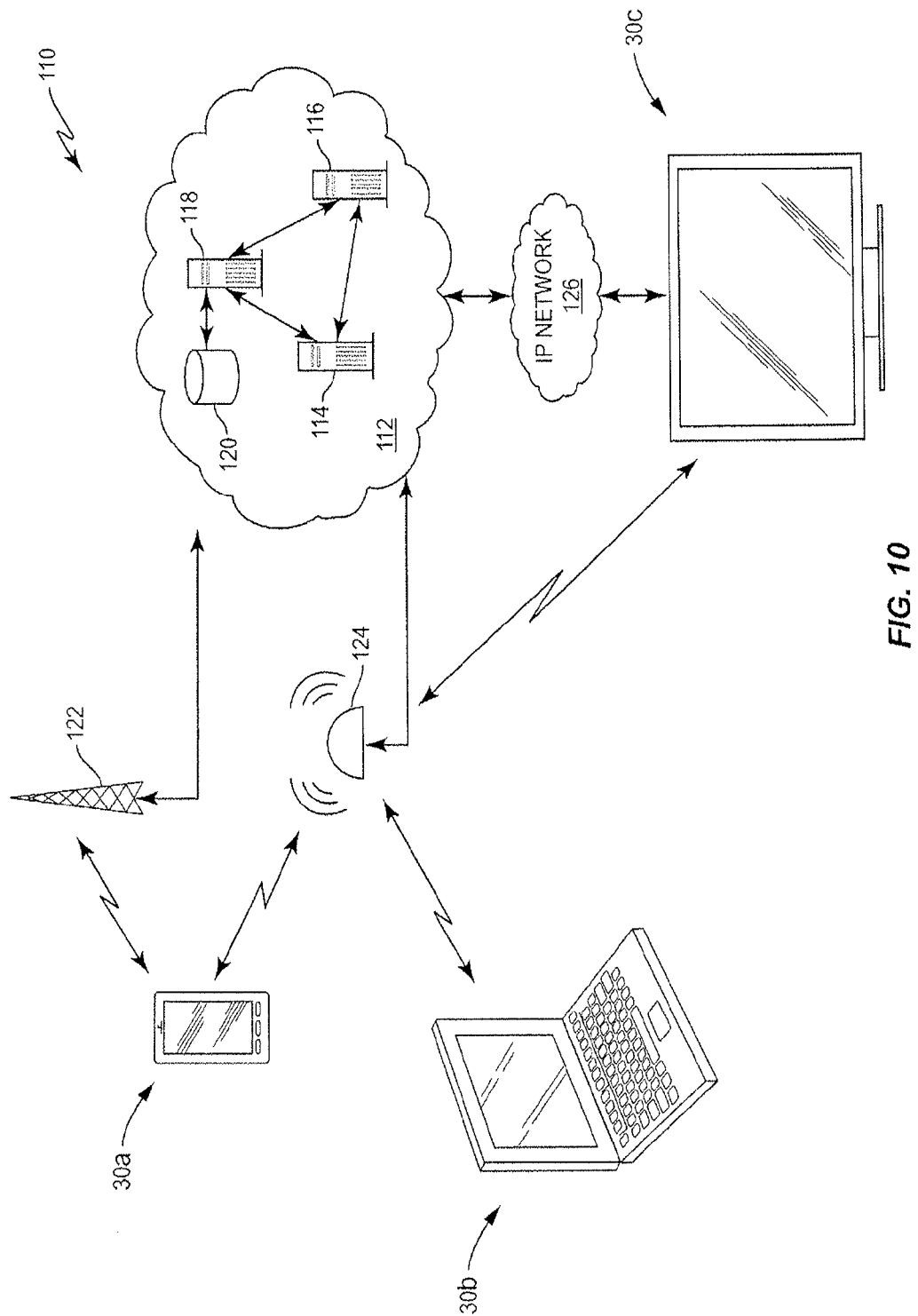
FIG. 10 is a block diagram illustrating a system architecture for a communication system configured to function according to one embodiment of the present invention.

FIG. 10 is a block diagram illustrating a communications system 110 suitable for use in one embodiment of the present invention. As seen in FIG. 10, system 110 comprises a cloud computing network (i.e., Cloud) 112 configured to communicate with one or more different host devices 30*a*, 30*b*, 30*c* (collectively, 30), via one or more access points (APs) 122, 124, 126. The Cloud 112 and the APs 122, 124, 126 are well-known in the art and not particularly germane to the present invention. Therefore, only a brief description for these entities is contained herein.

Cloud 112 comprises a communication network having a variety of different nodes 114, 116, 118, 120. Each node 114, 116, 118, 120 operates alone, or in conjunction with one or more of the other nodes, to provide a variety of different "on-demand" computational resources for consumption by the host devices 30. The nodes 114, 116, 118, 120 may comprise, for example, one or more servers, gateways, databases, or other hardware entities, that avail their software and hardware resources to the host devices 30. With such resources, host devices 30 are able to perform tasks such as view and edit blogs, store, view, and communicate images, videos, and documents, interact with remote parties using a social networking application such as FACEBOOK or TWITTER, access desired web sites, send and receive email and text messages, participate in chat sessions, store and retrieve personal contact lists, and the like.

The APs 122, 124, 126 comprise the requisite hardware and software needed to communicatively link the host devices 30 to the Cloud 112. The APs 122, 124, 126 may comprise, for example, a Radio Access Network (RAN) 122, a wireless access point (WAP) 124, or an IP network 126. The RAN 122 typically comprises one or more base stations that communicate with wireless devices, according to any known standard. Some exemplary standards include, but are not limited to, the standards known generally as the Global System for Mobile Communications (GSM), cdma2000, Universal Mobile Telecommunications System (UMTS), Wideband Code Division Multiple Access (CDMA), 3GPP Long Term Evolution (LTE), and Worldwide Interoperability for Microwave Access (WiMAX).

The WAP 124 also interconnects the host devices to the Cloud 112. Usually, the WAP 124 has a wired connection to the Cloud 112 via a router (not shown) and communicates with the various nodes (e.g., gateways) in the Cloud 112 using Transport Control Part (TCP)/Internet Protocol (IP). The WAP 124 also communicates with suitably-equipped wireless devices, such as host devices 30*a*, 30*b*, according to the IEEE 802.xx standards. In operation, the WAP 124 receives messages and data from the host devices 30*a*, 30*b* and forwards them to the nodes 114, 116, 118. Similarly, the WAP 124 receieves data from the nodes 114, 116, 118, and forwards that data wirelessly to the host devices 30*a*, 30*b*.

In some embodiments, a host device, such as host device 30*c*, is not configured to communicate wirelessly with RAN 122 or WAP 124. In these cases, the host device may comprise a hardware port (e.g., an Ethernet port) configured to communicatively connect the host device to a packet data communications network 126. The network 126 may be, for example, a private or public IP network connected to one or more nodes of the Cloud 112. In operation, the network 126 sends and receives, signaling, and other messages to and from the Cloud 112 and the host device 30*c*.

Figure 11:
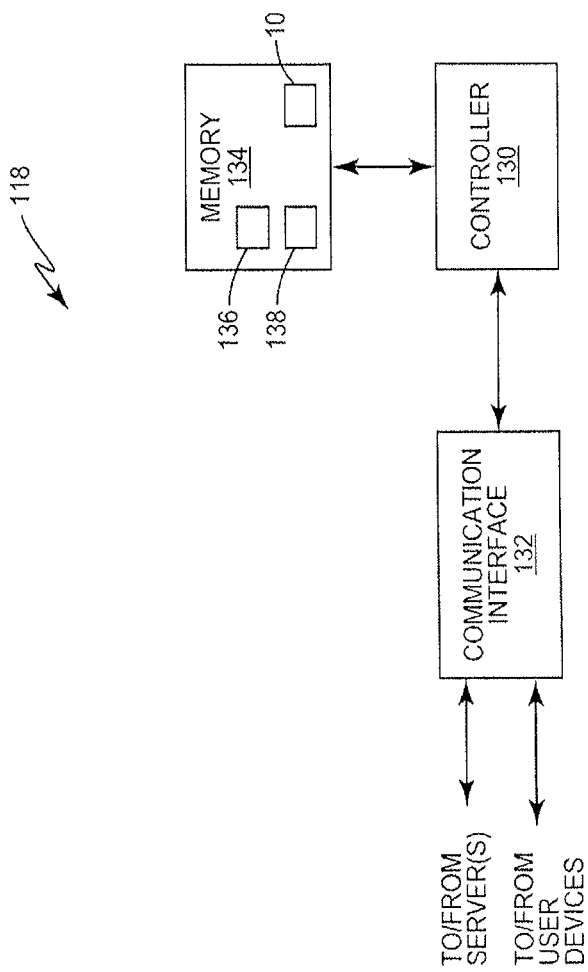
FIG. 11 is a block diagram illustrating some of the main component parts of a cloud-based server configured to operate according to the present invention.

FIG. 11 illustrates some of the component parts of a cloud-based server 118 suitable for executing the browser application 10 according to one or more embodiments of the present invention. As those of ordinary skill in the art will appreciate, the depiction of the particular components seen in FIG. 11 is merely illustrative. Additional components, including a variety of different hardware and software, may be, and usually are, present in such servers.

The cloud-based server 118 comprises a controller 130, a communication interface 132, and a memory 134. Browser application 10, as well as other software packages not specifically discussed herein, may be stored in memory 134.

The controller 130 comprises one or more microprocessors, microcontrollers, hardware, or a combination thereof. Similarly to controller 32 above, the controller 130 communicatively connects to the communication interface 132 and the memory 134 in server 118. As described below in more detail, controller 130 executes software application programs stored in memory 134 to share the intermediate representations of JavaScript® code and data across multiple tabs in the multi-tab browser application 10. In such a cloud-based server environment, the intermediate representations of the code and data may be shared across multiple tabs for a single user, as well as across the browser tabs associated with one or more different users connected to the server 118 and communicating with the browser application 10. Further, according to the present invention, the controller 130 may perform these functions without compromising the security of the individual users.

The communication interface 132 includes the requisite hardware and software needed to allow the server 118 to communicate with one or more host devices 30 via the communications network 112 and one or more of the APs 122, 124, 126. Communication interface 132 also contains the hardware and software needed for server 118 to communicate with one or more of the other nodes 114, 116, 120 in network 12. Those of ordinary skill in the art will appreciate that, although FIG. 11 depicts the communication interface 132 as a single block, the communication device 132 may comprise the same or different circuitry for communicating with the different end devices 30 via different APs 122, 124, 126.

In one embodiment, the communications interface 132 comprises a suitable Ethernet-based interface adapter card, such as a 10-BASE-T, Fast Ethernet, 10 GbE, or similar network card. In operation, the adapter card connects the cloud-based server 118 to a host device 30 via a packet data communications network. In yet another embodiment, the communication interface 118 may comprise a wireless LAN (802.11x) interface, or is a wireless interface card operating according to WiFi standards (e.g., IEEE 802.11) or BLUETOOTH. Those skilled in the art will appreciate that the interfaces listed herein do not comprise an exhaustive list, and that there are many additional interfaces that may be used to connect the cloud-based server 118 to multiple different types of host devices via communications network 112.

Memory 134 represents the entire hierarchy of memory in server 118, and may include both random access memory (RAM) and read-only memory (ROM). Software programs and data required for operating server 118 may be stored in non-volatile memory, such as EPROM, EEPROM, and/or flash memory, and may be implemented as discrete devices, stacked devices, or integrated with controller 130. The software programs may include an operating system such as WINDOWS, UNIX, LINUX, APPLE COMPUTER'S OS X, and the like. The software programs may also include user application programs that perform some function for one or more users that are connected to the server 118 via network 112. In one embodiment, for example, memory 134 includes two partitions—a shared memory resource 136 and a dedicated memory resource 138. Memory 134 also stores the browser application 10. As described in more detail later, one or more users connect to the server 118 and remotely execute the browser application 10 to interact with the Internet. The browser application 10 stores the intermediate representations in the shared memory 136 so that all users connected to the server 118 can share commonly used JavaScript files as previously stated, and maintains any user-specific data and code in the dedicated memory resource 138.

Figure 12:
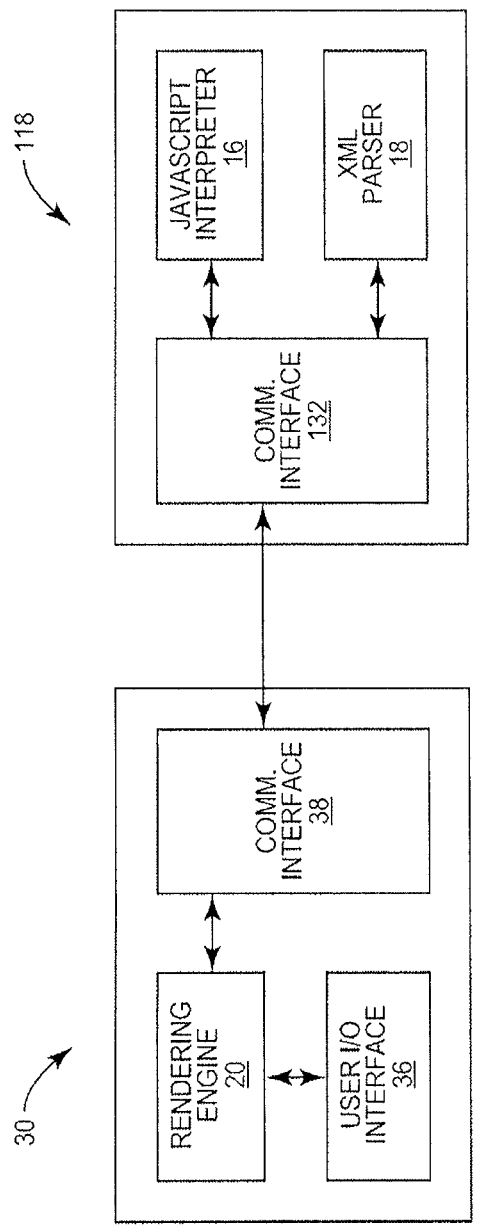
FIG. 12 is a block diagram illustrating a reference architecture for a browser application executing on a cloud-based server according to one embodiment of the present invention.

FIG. 12 is a block diagram that illustrates a host device 30 and a cloud-based server 118 communicating according to one embodiment of the present invention via their respective communication interfaces 38, 132. As seen in FIG. 12, the browser functions are split between the cloud-based server 118 and the host device 30. The cloud-based server 118 is configured to perform the core browser functions, and therefore, includes the JavaScript® interpreter 16 and the XML parser 18. Such functions include, but are not limited to, the parsing of a web page into a DOM tree, the laying out of the DOM tree into a render tree, and the interpretation and execution of the JavaScript® code. The host device 30 performs the rendering functions for the user, and thus, includes the rendering engine 20. The rendering engine 20 receives the render tree from the cloud-based server 118 and renders the resultant graphics to the User I/O Interface 36 (e.g., on the display) based on the information in the render tree. It should be noted that in these network-based embodiments, the render tree at the host device 30 is persistently synchronized with the render tree generated at the server 118.

Figure 13:
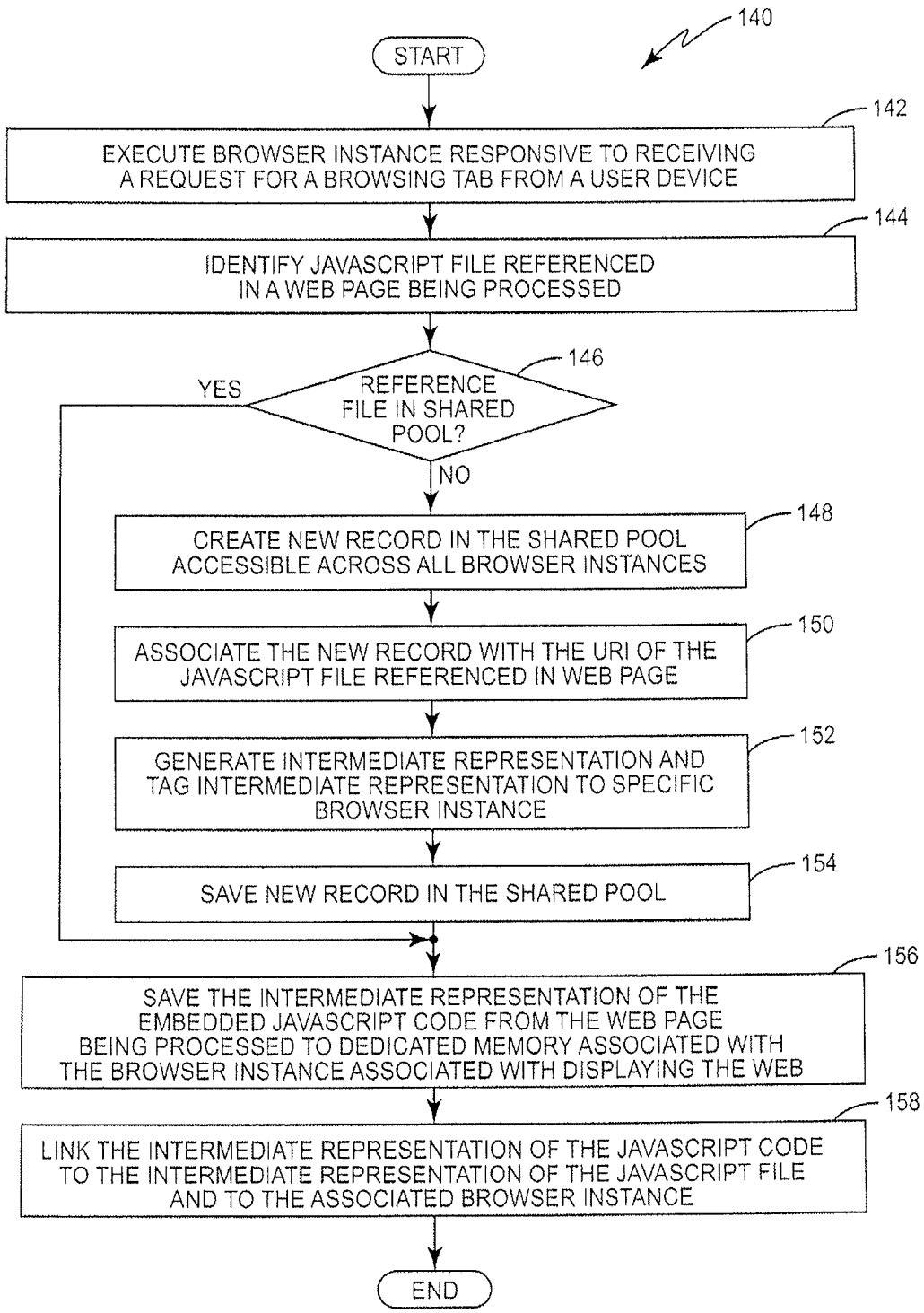
FIG. 13 is a flow diagram illustrating how a cloud-based server configured according to one embodiment of the present invention processes JavaScript® code.

FIG. 13 is a flow diagram illustrating a method 140 in which the cloud-based server 118 maintains the intermediate representations of the JavaScript files and stores them to memory in accordance with one embodiment of the present invention. It is assumed that a communication link between the host device 30 and the cloud-based server 118 is already established.

Method 140 begins with the server 118 receiving a request to open a new browser tab from the host device 30, and executing a browsing instance to provide the user with the requested tab (box 142). The request may be, for example, a request to retrieve a desired web page, or a request for a new browser tab in which the user can manually enter the URL for a desired web page. Regardless of the request, however, server 118 opens a browser tab, retrieves web page requested by the user, and processes code that defines the web page as previously described.

As discussed in the previous embodiments, the web page requested by the user may include or reference one or more JavaScript( )files. Therefore, while processing the web page, the browser application 10 first identifies these JavaScript files (box 144). Upon identifying a JavaScript® file, the server 118 determines whether the given file already exists and is referenced in the shared pool 136 (box 146). Such would be the case, for example, if one or more of the users already connected to server 118 had already accessed a web page that used or referenced the identified JavaScript file. If the JavaScript( )file exists in the shared pool 136, the controller 130 saves the intermediate representation of the embedded JavaScript® code generated during the processing of the web page to the dedicated memory resource 138 associated with the browser instance (e.g., the browser tab) processing the web page (box 156). Controller 130 then links the intermediate representation of the embedded JavaScript® file in the shared pool 136 to the intermediate representation of the embedded JavaScript® code stored in dedicated memory resource 138 and to the browser instance that processed the web page in which the JavaScript file is used (box 158).

If the file does not already exist in the shared pool 136, the controller 130 creates a new record in the shared pool 136 such that the record and the information it contains remains accessible to multiple users across multiple browser instances (box 148). The new record is then tagged with the specified URI of the JavaScript® file to associate the record with the file (box 150). The intermediate representation of the JavaScript® file is then generated, and the content of the JavaScript® file that was retrieved by the HTTP client or by the file system, the resultant syntax tree, and the variable list are saved to the new record in the shared pool (box 154).

As above, the JavaScript® file need not be saved to the shared pool 136 if the server 118 supports an HTML caching mechanism. However, the web page may still maintain its own JavaScript® syntax tree, variable list, and bytecode that are generated from the JavaScript® code snippets embedded within the web page. Therefore, controller 130 may save those artifacts to the dedicated memory resource 138 associated with the browser instance processing the web page (box 156), and link to the file in the shared memory resource 136 (box 158), as previously described.

Identifying the JavaScript® file(s) and linking the intermediate representations together at the cloud server 118 is different from performing these operations at a single host device 30. This is because the cloud-based server 118 provides a very different environment compared to that of host device 30. For example, the cloud-based server 118 allows each of a plurality of users to invoke multiple windows, tabs, or other browser components. This means that the same cloud-based server 118 can simultaneously execute and maintain different browsing instances initiated by different users. However, although the present invention allows these different browsing instances to access and share the intermediate representation(s) of the external JavaScript files, it does not compromise a user's privacy. Particularly, the external JavaScript files are already publicly available to each of the users, and thus, sharing them among different users poses no privacy risks. Further, the application code (i.e., the JavaScript) lacks the ability to access the shared memory pool, and thus, is not able to determine whether certain JavaScript files already exist in the shared memory pool as does the present invention. Therefore, the interpreter 16 at the cloud-based server 118 is configured to perform this function.

The JavaScript language does provide features that allow JavaScript files to determine whether a given symbol can be modified at runtime by the embedded JavaScript code or some other external JavaScript code. However, as previously described, any such "local" runtime modifications to these symbols or variables are saved to the dedicated memory resource 138 associated with the specific browsing instance (i.e., the "dirty" variable list). Therefore, the method of the present invention poses no greater security risk with respect to a user's privacy than is already present at the cloud-based server 118.

Additionally, when executing on a cloud-based server 118, consideration must be given to the fact that different users can, and do, use different browsers to access the web—each of which may use a different interpreter. Thus, the server 118 is configured to process and store the intermediate representations in accordance with each of the JavaScript interpreters. By way of example only, some users may employ MICROSOFT'S INTERNET EXPLORER while other users employ MOZILLA FIREFOX, GOOGLE CHROME, or SAFARI. Each may utilize a different JavaScript interpreter 16, and therefore, require different processing. According to one embodiment, each intermediate representation of an external JavaScript file in the shared pool 136 is tagged with a value or other identifier an identifier that identifies the particular browser instance with which it is associated. Each associated external JavaScript file is also correspondingly marked with the identifier. Then, before the intermediate representation in the shared memory pool 136 can be linked to the dedicated memory resource 138 associated with the browsing instance, the intermediate representation is matched to the browsing instance.

Additionally, linking the intermediate representation of the JavaScript file in the shared pool 136 to the dedicated memory resource 138 associated with the browsing instance in the cloud-based server embodiments can, at times, be more complex than when such linking is performed at host device 30. For example, on as host device 30, the shared memory in which the intermediate representations of the JavaScript files are stored is simply mapped to the browser instance process. However, cloud-based embodiments have an added consideration—i.e., whether the cloud-based server is also running one or more Virtual Machines (VMs). If the cloud-based server executes and maintains the browsing instances as processes outside the boundaries of the VMs (or if there are no VMs on the server), then the shared memory 136 storing the intermediate representation can simply be mapped to the process associated with the particular browsing instance. However, if the browsing instances of different users are running in different VMs on one or more physical machines, the intermediate representations may be stored in a virtual storage device that is mounted to a selected VM such that all VMs can access the intermediate representations stored thereon. Other inter-VM shared memory mechanisms can also be used.

Thus, the present invention, when executed in the realm of a cloud-based server 118, helps the browser applications executing on the server to avoid repeatedly interpreting commonly used JavaScript files. Rather, the present invention configures the server to generate a syntax tree and the bytecode for a given JavaScript file only once, and then places these artifacts in a memory that is accessible across a plurality of different browser instances associated with one or more different users. This will save a significant amount of memory at the server by avoiding the generation and storage of redundant data structures, and eliminate or greatly reduce the overhead associated with the subsequent runtime interpretation of the file. The present invention will also reduce execution time, and therefore, will improve the users' browsing experience and save on the costs for cloud infrastructure.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A network server having access to one or more virtual machines, the network server comprising:
   a communication interface configured to communicate data with a plurality of different user devices via a communications network;
   a memory configured to store a web browser application; and
   a processing circuit configured to execute one or more browsing instances of the browser application responsive to receiving corresponding requests from one or more of the user devices, and to:
      interpret embedded code in a web document retrieved by a first browsing instance;
      generate an intermediate representation of the embedded code in the web document;
      store the intermediate representation of the embedded code in a corresponding dedicated memory resource associated with the first browsing instance;
      determine whether the intermediate representation of an external file referenced by the web document is stored in a shared memory resource accessible to other browsing instances associated with one or more other user devices;
      if the intermediate representation of the external file is not stored in the shared memory resource, fetch the external file, generate the intermediate representation of the external file, and store the intermediate representation of the external file in the shared memory resource;
      associate the intermediate representation of the external file stored in the shared memory resource with the first browser instance; and
      link the intermediate representation of the external file stored in the shared memory resource to the intermediate representation of the embedded code in the dedicated memory resource and to the first browser instance based on whether the first browsing instance is executing on one of the one or more virtual machines accessible to the network server.

2. The network server of claim 1 wherein to link the intermediate representation of the external file in the shared memory resource to the intermediate representation of the embedded code in the dedicated memory resource, the processing circuit is configured to map the shared memory resource that stores the intermediate representation of the external file to the first browsing instance if the first browsing instance is not executing on one of the one or more virtual machines accessible to the network server.

3. The network server of claim 2 wherein if the first browsing instance is executing on a virtual machine, the processing circuit is further configured to store the intermediate representation of the external file in a virtual storage device mounted to one or more of the virtual machines.

4. The network server of claim 1 wherein to store the intermediate representation of the external file in the shared memory resource, the processing circuit is further configured to:

identify the external file from the embedded code in the web document associated with the first browsing instance;

create a record in the shared memory resource to store the intermediate representation of the external file;

tag the new record with a Uniform Resource Indicator identifying the external file; and store the record in the shared memory resource such that the record is accessible to the other browsing instances associated with the other user devices.

5. The network server of claim 1 wherein the intermediate representation of the embedded code and the intermediate representation of the code from the external file comprises one or more of a syntax tree, a symbol table, bytecode, and the file content of the external file.

6. The network server of claim 1 wherein the processing circuit is further configured to compare the external file content referenced by the web document associated with the first browsing instance with the external file content stored in the shared memory resource to determine whether the two are the same.

7. The network server of claim 6 wherein if the external file content is different than the external file content stored in the shared memory resource, the processing circuit is further configured to:

fetch the external file;

generate the intermediate representation of the external file; and store the intermediate representation of the external file in the shared memory resource.

8. The network server of claim 1 wherein each of the one or more browsing instances comprises one of a tab in a multi-tab browser, a browser window, and a frame.

9. A method of executing a browser application at a server in a communications network wherein the server has access to one or more virtual machines, the method comprising:

executing one or more browsing instances of a browser application stored in memory at the server responsive to receiving corresponding requests from one or more user devices, wherein a plurality of different browser applications are stored in the memory at the server;

interpreting embedded code in a web document retrieved by a first browsing instance;

generating an intermediate representation of the embedded code in the web document;

storing the intermediate representation of the embedded code in a corresponding dedicated memory resource associated with the first browsing instance;

determining whether the intermediate representation of an external file referenced by the web document is stored in a shared memory resource accessible to other browsing instances associated with one or more other user devices;

if the intermediate representation of the external file is not stored in the shared memory resource, fetching the external file, generating the intermediate representation of the external file, and storing the intermediate representation of the external file in the shared memory resource;

associating each intermediate representation of the external files stored in the shared memory resource with the first browser instance; and linking the intermediate representation of the external file stored in the shared memory resource to the intermediate representation of the embedded code in the dedicated memory resource and to the first browser instance based on whether the first browsing instance is executing on one of the one or more virtual machines accessible to the server.

10. The method of claim 9 wherein linking the intermediate representation of the external file in the shared memory resource to the intermediate representation of the embedded code in the dedicated memory resource comprises mapping the shared memory resource that stores the intermediate representation of the external file to the first browsing instance if the first browsing instance is not executing on one of the one or more virtual machines accessible to the network server.

11. The method of claim 10 wherein if the first browsing instance is executing on a virtual machine, storing the intermediate representation of the external file in a virtual storage device mounted to one or more of the virtual machines.

12. The method of claim 9 wherein storing the intermediate representation of the external file in the shared memory resource comprises:

identifying the external file from the embedded code in the web document associated with the first browsing instance;

creating a record in the shared memory resource to store the intermediate representation of the external file;

tagging the new record with a Uniform Resource Indicator identifying the external file; and storing the record in the shared memory resource such that the record is accessible to the other browsing instances associated with the other user devices.

13. The method of claim 9 further comprising comparing the external file content referenced by the web document associated with the first browsing instance with the external file content stored in the shared memory resource to determine whether the two are the same.

14. The method of claim 13 wherein if the external file content is different than the external file content stored in the shared memory resource, the method further comprises:

fetching the external file;

generating the intermediate representation of the external file; and storing the intermediate representation of the external file in the shared memory resource.

* * * * *